Feb. 1, 1944.  C. L. DEWEY  2,340,309
CURVED WALL WELDED CONNECTION
Filed July 6, 1942
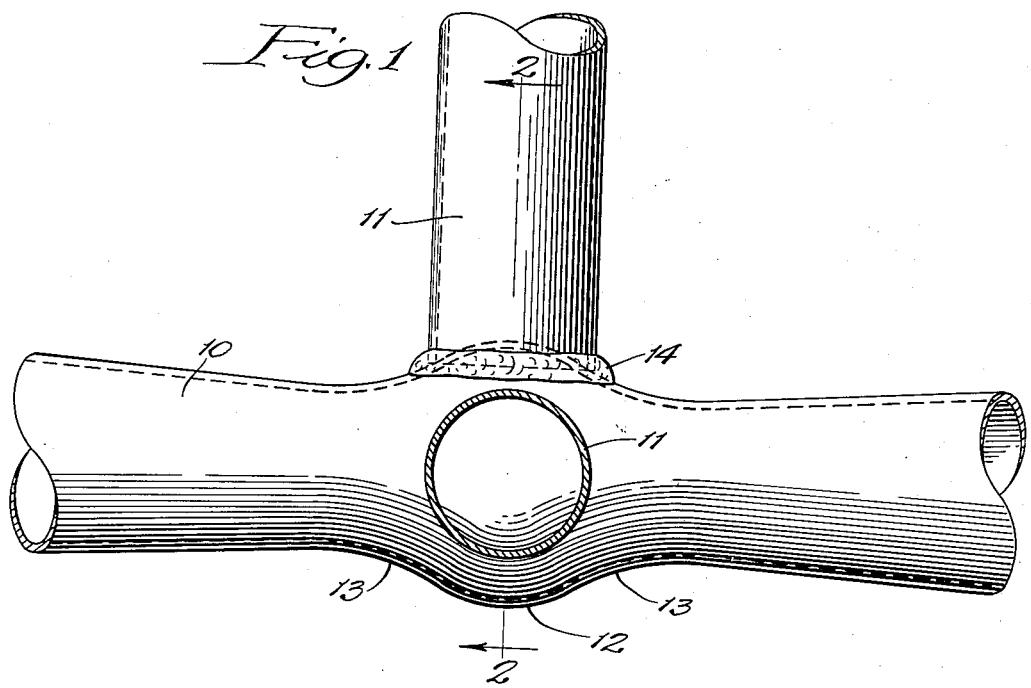
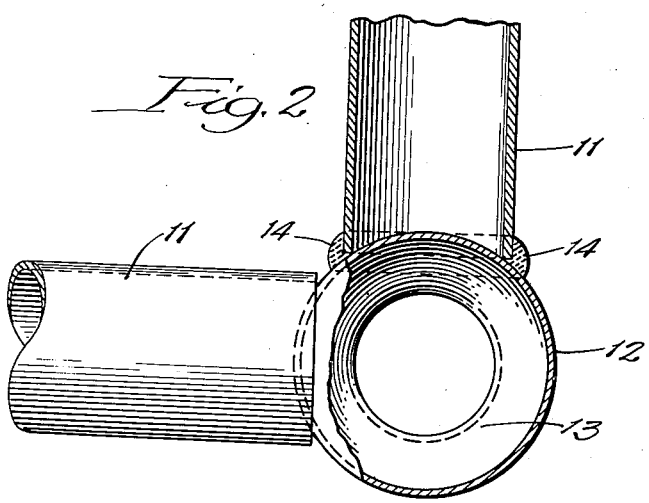
Inventor.
Clarence L. Dewey,
By Banning & Banning
Attorneys.

Patented Feb. 1, 1944

2,340,309

UNITED STATES PATENT OFFICE 2,340,309

CURVED WALL WELDED CONNECTION

Clarence L. Dewey, Elkhart, Ind.

Application July 6, 1942, Serial No. 449,914

3 Claims. (Cl. 287—54)

The welded connection of the present invention has been particularly designed for use in aircraft frame construction, in which lightness, rigidity and strength are of extreme importance and in which it becomes necessary to provide connections between the longitudinal stringers, or longerons, of the frame and the upstanding and cross, or horizontal struts.

The present connection is designed to afford a close and rigid union between tubular elements of the general character stated which are secured by welding at the joint and without the provision for added reinforcement. In the joint of the present invention, the angularly disposed elements are so arranged that a close and even contact is afforded between a spherically bulged section of one of the tubular elements which affords a close and even fit for the butt end of the other tubular element in preparation for the application of a welding ring around the joint to effect the permanent union of the parts. Although the invention has especial reference to aircraft construction, it will, of course, be understood that it is equally applicable in the case of numerous structures in which a similar connection may be employed.

Further objects will appear from a detailed description of the invention in conjunction with the accompanying drawing in which Figure 1 is a side elevation of a portion of an aircraft frame showing the union between one of the longitudinal stringers and one of the vertical struts, and Fig. 2 is a cross-sectional view taken on line 1—1 of Fig. 1 showing a vertical strut with the welding ring applied and a horizontal cross-connection positioned in preparation for the application of the welding ring.

As shown, the joint of the present invention is formed to afford connection between a longitudinally extending tubular element 10 and one or more radially extending tubular elements 11. The longitudinal tubular element is preferably, though not necessarily, configured to the desired shape by the employment of the method and mechanism of the Dewey Patent No. 2,265,723, issued December 9, 1941.

As shown, the tubing is reversely tapered toward the center at which point a spherically walled bulge or enlargement 12 is provided. The spherical curvature of the wall is uniformly maintained throughout the medial portion of the bulge so that a uniform contact surface is afforded for the butt ends of one or more tubular elements 11 which may extend vertically therefrom or at a slight angle thereto without the necessity for recessing or otherwise configuring the butt ends thereof, which, as shown, are cut squarely across thereby effecting a saving in time and expense in the fabrication of the metal.

The true spherical curvature of the bulge extends through an arc which is at least as great on its chord as the cross diameter of the radiating member which will suffice in cases where it is desired to unite the parts in right angular relation to one another, but if it is desired to afford an oblique union, the spherical curvature should be greater than the cross diameter of the radiating member to allow the same to be obliquely positioned upon a truly spherical portion of the surface.

As shown, the spherical curvature merges into a reversely curved neck portion 13 which affords a gradual union with the tapered portion of the member 10, but if desired, the true spherical curvature may be further extended and a more abrupt union afforded between the portions of the tubing.

With the radiating member positioned as shown at the left, a uniform and unbroken contact will be afforded around the butt end of the radial member and the spherical wall in preparation for the application of a welding ring 14 which overlaps the abutting surfaces and works in under the outer portion of the butt end of the radial member thereby firmly and rigidly uniting the parts together in an uninterrupted union and without the provision of extraneous or additional means of attachment.

Furthermore, the union is one which maintains the integrity throughout of the longitudinal stringer 10 which is not cut through or flanged at the joint but extends uninterruptedly therethrough, thereby maintaining a maximum strength and rigidity in the structure, which, together with lightness, are of prime importance in aricraft or similar constructions.

Furthermore, the nature of the joint is such that no special fabrication of the metal is required other than the provision of the spherical bulge which may be formed at a single point or at recurrent intervals in the configuring of tubing in the manner set forth in the Dewey patent, No. 2,265,723, which is likewise a matter of prime importance in the construction of aircraft or the like, in which speed in the fabrication and assembly of the parts are of prime importance.

Although for most purposes a bulge of truly spherical curvature is desirable, in conjunction with a cylindrical radial member cross cut at right angles to afford a truly circular butt end, I am aware of the fact that a departure from this configuration may be made wherein an elliptical radial member may be cross cut to provide a truly circular butt end, or wherein complementary curvatures in the wall of the bulge and the butt end of the radial member may afford uninterrupted contact throughout, and it will be understood that unless otherwise indicated, the claims are intended to cover such departures from a truly spherical and a truly circular configuration provided only that the radial member is cross cut on a true plane to afford an edge wall curvature which will abut uninterruptedly and snugly upon the curving surface of the bulge.

I claim:

1. In a welded connection of the character described, the combination of a first element having formed therein a bulge having an imperforate spherical wall, a second cylindrically tubular element cross cut on a flat plane to afford a butt end face having a circular wall contacting uninterruptedly along its inner rim only around the curvedly walled bulge to afford uniform contact therewith and a welding ring surrounding and underlying the butt face and uniting the elements together.

2. In a welded connection of the character described, the combination of a first tubular element having formed therein at an intermediate point a curvedly walled bulge presenting an imperforate wall smoothly curving inwardly in all directions from the crest of the bulge, a second curvedly walled tubular element cross cut to afford a flat planate butt end face having a curving wall engaging uninterruptedly along its inner rim only around the curvedly walled bulge to maintain uniform rim contact therewith and a welding ring surrounding the joint and underlying the butt face and uniting the elements together.

3. In a welded connection of the character described, the combination of a first tubular element having formed therein a curvedly walled bulge presenting an imperforate wall smoothly curving inwardly in all directions from the crest of the bulge, a second curvedly walled tubular element cross cut to afford a flat planate butt end face having a curving wall engaging uninterruptedly along its inner rim only around the curvedly walled bulge to maintain uniform rim contact therewith, and a welding ring surrounding the joint and underlying the butt face and uniting the elements together.

CLARENCE L. DEWEY.